(12) United States Patent
Klingauf et al.

(10) Patent No.: US 11,914,521 B1
(45) Date of Patent: Feb. 27, 2024

(54) CACHE QUOTA CONTROL

(71) Applicant: Apple Inc., Cupertino, CA (US)

(72) Inventors: Wolfgang H. Klingauf, Morgan Hill, CA (US); Muhammad Umer Amjad, Cupertino, CA (US); Connie W. Cheung, Sunnyvale, CA (US); Yueh-Ta Wu, Sunnyvale, CA (US); Muditha Kanchana, Cupertino, CA (US); John H. Kelm, Belmont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/809,822

(22) Filed: Jun. 29, 2022

Related U.S. Application Data

(60) Provisional application No. 63/239,356, filed on Aug. 31, 2021.

(51) Int. Cl.
  *G06F 12/0895* (2016.01)
  *G06F 12/0837* (2016.01)
  *G06F 12/0873* (2016.01)

(52) U.S. Cl.
  CPC ...... *G06F 12/0895* (2013.01); *G06F 12/0837* (2013.01); *G06F 12/0873* (2013.01)

(58) Field of Classification Search
  CPC ............. G06F 12/0837; G06F 12/0873; G06F 12/0895
  See application file for complete search history.

(56) References Cited

U.S. PATENT DOCUMENTS

| | | | |
|---|---|---|---|
| 7,000,072 B1 * | 2/2006 | Aisaka | G06F 12/0842 711/E12.07 |
| 10,102,150 B1 | 10/2018 | Visvanathan et al. | |
| 2006/0161755 A1 * | 7/2006 | Uchikawa | G06F 9/5016 711/170 |
| 2014/0075118 A1 * | 3/2014 | Biswas | G06F 12/123 711/E12.017 |
| 2014/0331234 A1 | 11/2014 | Gibson et al. | |
| 2015/0363113 A1 * | 12/2015 | Rahman | G06F 3/0653 711/170 |
| 2016/0350232 A1 | 12/2016 | Knies et al. | |
| 2017/0083435 A1 * | 3/2017 | Walker | G06F 12/023 |
| 2018/0253247 A1 * | 9/2018 | Li | G06F 3/0631 |
| 2022/0385732 A1 * | 12/2022 | Radi | G06F 12/084 |

FOREIGN PATENT DOCUMENTS

JP 07248967 A * 9/1995

* cited by examiner

*Primary Examiner* — Aracelis Ruiz
(74) *Attorney, Agent, or Firm* — Kowert, Hood, Munyon, Rankin & Goetzel, P.C.; Erik A. Heter; Dean M. Munyon

(57) ABSTRACT

A mechanism for cache quota control is disclosed. A cache memory is configured to receive access requests from a plurality of agents, wherein a given request from a given agent of the plurality of agents specifies an identification value associated with the given agent of the plurality of agents. A cache controller is coupled to the cache memory, and is configured to store indications of current allocations of the cache memory to individual ones of the plurality of agents. The cache controller is further configured to track requests to the cache memory based on identification values specified in the requests and determine whether to update allocations of the cache memory to the individual ones of the plurality of agents based on the tracked requests.

20 Claims, 9 Drawing Sheets

CACHE QUOTA CONTROL

PRIORITY INFORMATION

The present application claims priority to U.S. Provisional App. No. 63/239,356, entitled "Cache Quota Control," filed Aug. 31, 2021, the disclosure of which is incorporated by reference herein in its entirety.

BACKGROUND

Technical Field

This disclosure is directed to processors, and more particularly, to cache subsystems used in processors.

Description of the Related Art

Computer systems employ various types of memory in a memory hierarchy. This hierarchy may extend from architected registers in a processor (e.g., to store operands for instructions to be executed), to bulk storage on a hard disk drive or solid state drive. Many computer systems include multiple levels of cache memory as well.

Cache memory is a type of memory that is lower in a memory hierarchy than registers, but higher in the memory hierarchy than main system memory. A cache may store information based on principles of locality, including temporal locality (e.g., information recently accessed is likely to be accessed again within a given time) and spatial locality (e.g., information recently accessed is likely to be stored near other information that will be accessed). Information stored in a cache based on these principles may be accessed faster than it would otherwise be if only stored in system RAM or bulk storage. Thus, caches may improve the overall performance of computer systems by reducing access times for at least some information that is to be used by the processor.

SUMMARY

A mechanism for cache quota control is disclosed. In one embodiment, a cache memory is configured to receive access requests from a plurality of agents, wherein a given request from a given agent of the plurality of agents specifies an identification value associated with the given agent of the plurality of agents. A cache controller is coupled to the cache memory, and is configured to store indications of current allocations of the cache memory to individual ones of the plurality of agents. The cache controller is further configured to track requests to the cache memory based on identification values specified in the requests and determine whether to update allocations of the cache memory to the individual ones of the plurality of agents based on the tracked requests.

In one embodiment, the cache controller includes a plurality of counters corresponding to ones of the plurality of agents. The counters are configured to count requests by the agents. The cache controller may also include a timer. Upon expiration of a timer interval tracked by the timer, a cache allocation circuit may compare the various count values, and may further compare the values to various thresholds. Based on these operations, the allocation circuit may determine the cache allocations for the various agents. This determination may include updating the allocations to provide a greater cache quota for those agents indicated as having a greater demand for cache space, and reducing the cache quota for those agents having a lesser demand.

BRIEF DESCRIPTION OF THE DRAWINGS

The following detailed description makes reference to the accompanying drawings, which are now briefly described.

DETAILED DESCRIPTION OF EMBODIMENTS

Figure 1:
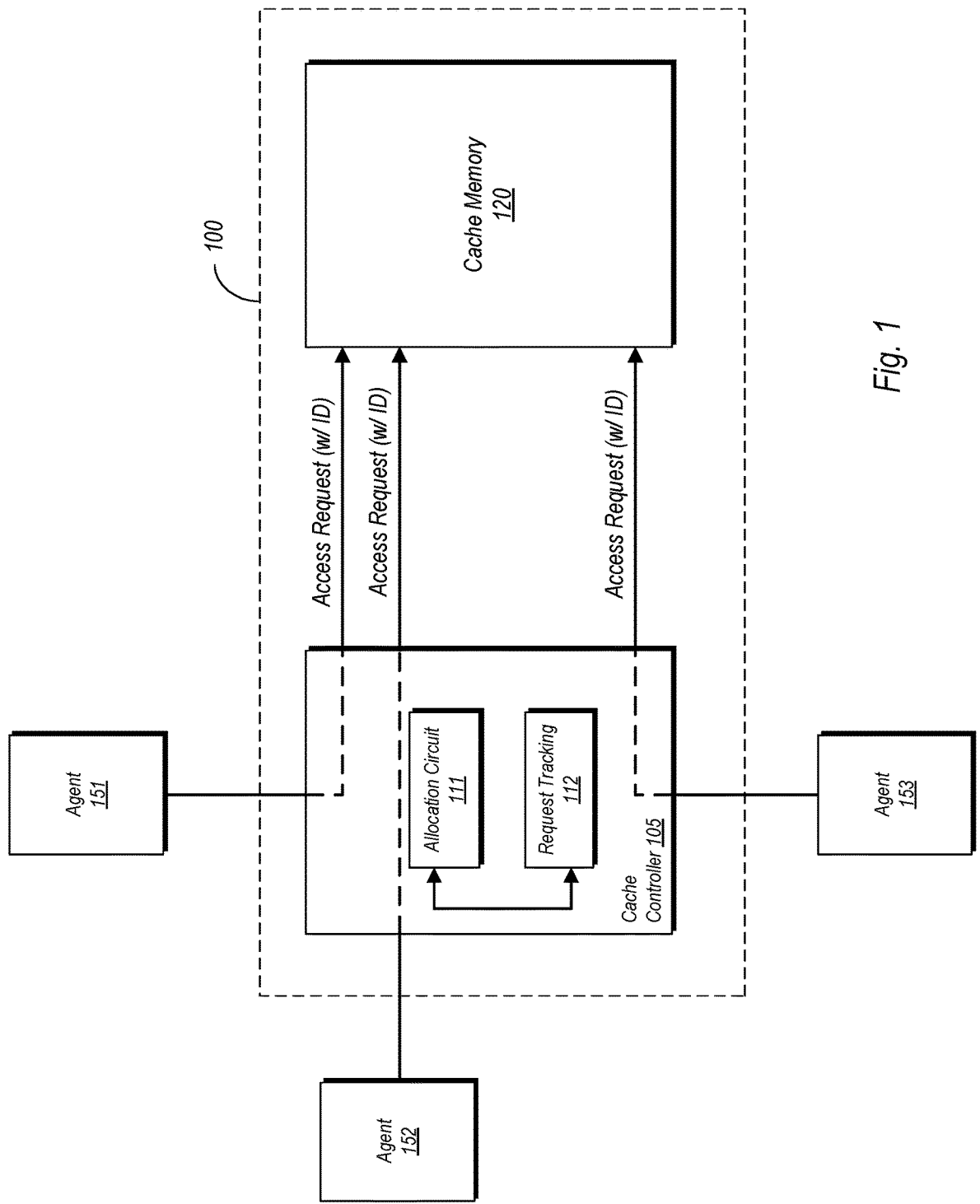
FIG. 1 is a block diagram of one embodiment of a cache subsystem.

The present disclosure is directed to various mechanisms for controlling an amount of cache quota allocated to various agents (or requestors) within a computer system. The agents may include either hardware or software components.

Modern computer systems use various methods to manage space allocations in a cache for various agents submitting requests for access thereto. For example, a cache subsystem may implement eviction and replacement policies to control the amount of cache memory allocated for use by various agents. However, this methodology is largely reactive and open loop.

When an application, thread, or some other grouping of instructions begins executing on a processor or processor core, a certain quota of cache memory space may be allocated thereto. This quota may basically remain static, or may change reactively due to, e.g., eviction policies. For example, if a user of a smartphone activates a camera application, the camera driver may communicate with the cache subsystem and receive an allocation of a particular amount of cache space. However, after taking a photo or video, the work of the camera and its associated driver may be largely complete, while another agent (e.g., a graphics processing unit, GPU) may begin work to process the photo/video. Nevertheless, the allocation of cache space provided to the camera application may remain in place, even if it is no longer doing any work that requires cache accesses. The cache allocation to the camera application may thus take away space in the cache that could be allocated to other agents that are actively doing work that could benefit from use of the cache. While system software may monitor cache usage in some cases, it typically lacks the capability to adjust cache space allocations with a granularity that could allow optimization.

The present disclosure makes use of the insight that cache quota control in those systems discussed above is largely open loop and lacks the granularity to optimize cache space use. Accordingly, the present disclosure proposes closed-loop cache quota control, with the use of hardware in a cache subsystem that can make timely adjustments to cache quota to optimize cache usage.

In one embodiment, a cache controller in a cache subsystem includes an allocation circuit and a tracking circuit. The tracking circuit may track cache access requests (and more generally, memory access requests) by various agents competing for space in the cache. The allocation circuit may use information from the tracking circuit to determine cache quotas, performing updates if the cache allocations are not optimized. In various embodiments, this may be performed periodically. More generally, the determination and updating of cache quotas may be performed at various times during operation of the cache subsystem.

One embodiment of a request tracking circuit includes hardware counters that count cache access requests by agents that are associated with various identifiers. The allocation circuit may use these count values to determine whether to update the current cache allocations. For example, the various count values may be compared to various threshold values, and based on these comparisons, the cache allocations may be updated. Embodiments may also include a timer used to set a periodicity for monitoring the count values and determining whether to update current cache allocations.

Using the various mechanisms disclosed herein, a proactive, closed-loop, fine-grain control of cache allocations may be attained. The granularity of control may exceed that which is possible by system software, thereby updating the cache allocations more frequently and more responsively to changing demands by the various agents. This may in turn increase the hit rate for cache access requests while correspondingly reducing the requirement to obtain information from system memory, and thereby increase overall performance.

Embodiments are further contemplated where different agents and identifiers associated therewith may be assigned different weights based on, e.g., historical cache usage. This may further aid in determining cache allocations by increasing the likelihood that agents more likely to create an ongoing demand for cache accesses may be allocated additional cache space over those agents that request smaller amounts of cache space and/or for shorter amounts of time.

The present disclosure begins with a discussion of example cache subsystems that can be used to implement various embodiments of the cache quota control systems discussed herein. A conceptual model of a cache quota control loop is then discussed, followed by descriptions of the use of data set identifiers in various embodiments. Thereafter, different methods for operating a cache subsystem are discussed in the context of associated flow diagrams. The description concludes with a discussion of an example system.

Cache Subsystems with Closed-Loop Cache Quota Control:

FIG. 1 is a block diagram of one embodiment of a cache subsystem. In the embodiment shown, cache subsystem 100 includes a cache controller 105 and a cache memory 120. Cache subsystem 100 is arranged to receive cache access requests from a plurality of agents, e.g., agents 151, 152, and 153 in this particular example. These agents may be associated with a particular unit of hardware or software. For example, an agent in accordance with this disclosure could be a device driver for a particular peripheral device (not shown). An agent in accordance with this disclosure may also be a particular software program or instruction thread executing on a processor of a corresponding computer system, wherein the program/instruction thread does not otherwise have any particular association with a specific piece of system hardware. Generally speaking, an agent per this disclosure may be any entity, hardware or software, capable of submitting a request for access to cache memory 120. Requests generated by the various agents 151, 152, and 153 may each be associated with a particular identifier that associates the request with that agent. These identifiers may also correspond to a particular data set or task, as will be discussed in further detail below. Cache controller 105 in the embodiment shown may include any circuitry upon which the operations of the cache is dependent, e.g., for read, operations, write operations, and so on. Circuitry that is capable of controlling some aspects of cache operation but is otherwise not dedicated exclusively thereto may also fall within the scope of circuitry that is part of a cache controller as defined herein.

Cache controller 105 in the embodiment shown includes an allocation circuit 111 configured to set and store indications of current allocations of particular amounts of space in cache memory 120 to the particular requesting agents. For example, allocation circuit 111 may allocate a first amount of space in cache memory 120 to agent 151, a second amount of space to agent 152, and a third amount of space to agent 153, with the amount of allocated space differing among these agents. The allocations of cache memory may be initially set at the beginning of operation. From time to time, allocation circuit 111 may update the allocations as operating conditions change. In some embodiments, this may occur periodically. Embodiments are also possible and contemplated wherein changes to the cache allocations are event-driven, and thus do not occur at regular intervals. Embodiments that employ some combination of periodic and event-driven allocation updates are also possible and contemplated. Between updates, access to cache 120 for both read and write purposes may be controlled at least in part based on allocation information stored in allocation circuit 111.

It is noted that the amount of allocated cache space for a given agent does not necessarily reflect its current usage of that space. It is possible at any given time that a particular agent will be using less than its full amount of allocated space. It is also possible that at any given time the particular agent has a demand for a greater amount of cache space that is currently allocated thereto. This may provide a basis for adjusting cache allocations from time to time. Thus, the amount of cache allocated to a particular agent may be adjusted downward if it is not using all of its allotted space, while adjustments may be upward for another agent that is using all of the cache space allocated thereto and has a demonstrated demand for additional space.

Cache controller 105 also includes a request tracking circuit 112. This circuit may allow the requests for cache access submitted by the various agents to be tracked over time. The tracking may be conducted based on identification values specified in the requests, wherein the identification values are associated with the various agents. Tracking the requests may include counting the number of requests submitted by each of the requesting agents. Other metrics may also be tracked in various embodiments. For example, embodiments are possible and contemplated wherein request tracking circuit 112 also tracks the number of cache hits for each of the requestors and calculates the hit rate. Request tracking circuit 112 in various embodiments may also track variation in the lines requested by particular ones of the agents to determine if the requests submitted thereby are focused on a single cache line, a small number of cache lines, or a large number of cache lines. For example, if an agent is making frequent requests that are focused on a single cache line or a very small number of cache lines, its demand for cache space may be indicated as being relatively small despite having made a large number of requests.

Allocation circuit 111 may utilize the information from request tracking circuit 112 to determine whether current cache allocations are to be updated. Using the information on the tracked requests, allocation circuit 111 may increase or decrease the amount of cache space allocated to a particular agent, keep the amount of cache space the same, or de-allocate entirely the cache space from a particular agent (e.g., if it becomes idle or discontinues operation, as indicated by a lack of requests). These determinations may be made at the particular time intervals, which may be (as noted above) periodic and/or event driven.

Generally speaking, cache subsystem 100 as disclosed herein may implement a closed-loop quota control for allocating space in the cache 120 to the various agents requesting access thereto. The closed-loop control of cache allocations may be demand driven, with the allocation circuit 111 allocating more cache space to agents having a larger demand with respect to those agents having smaller demands. This may optimize cache usage by increasing the hit rate and reducing the number of accesses to system memory. This may in turn allow for overall performance gains.

Figure 2A:
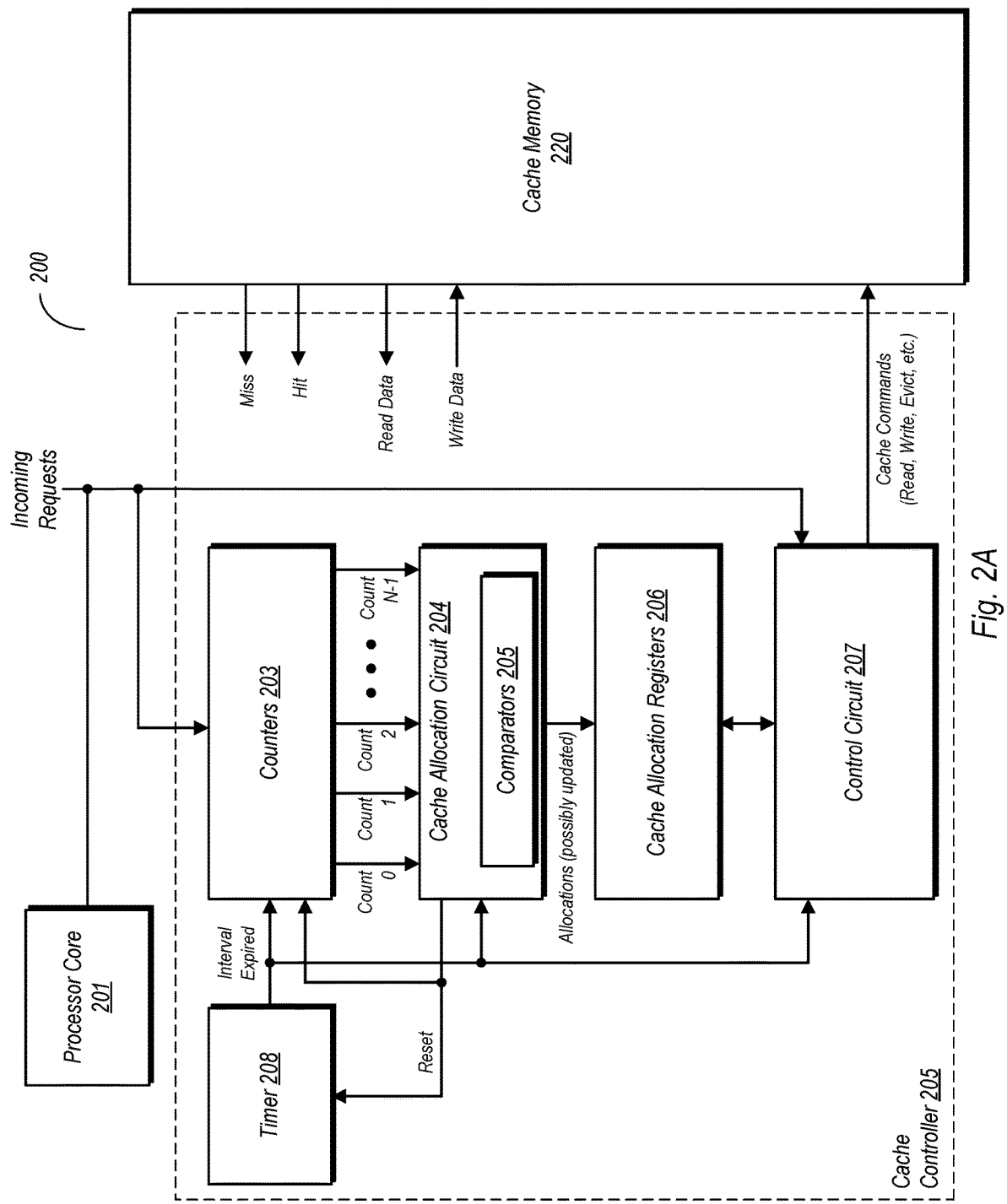
FIG. 2A is a block diagram of another embodiment of a cache subsystem.

FIG. 2A is a block diagram of another embodiment of a system including a cache subsystem. In the embodiment shown, system 200 includes a processor core 201 coupled to a cache controller 205, which is part of a cache subsystem that also includes cache memory 220. Cache memory 220 may be one of a number of different types of caches, such as a set associative cache or fully associative cache. Furthermore, cache memory 220 may be a cache implemented at one of a number of different levels. For example, in one embodiment, cache memory 220 may be a Level One (L1) data cache, while in another embodiment, cache memory 220 may be a lower level (e.g., L2) unified cache that stores both instructions and data. Processor 201 may submit to cache controller 205 requests for access to cache memory 220. Various software programs and instruction threads thereof may comprise some of the agents that may request access to cache memory 220. Peripheral components and associated driver software, graphics processors and software/instruction threads executing thereon, and other components, both hardware and software, may also be included in the various agents that may request access to cache 220. The accesses by these agents may be managed by cache controller 205.

Cache controller 205 in the embodiment shown includes a control circuit 207 which carries out various cache control functions. These functions include issuing commands for read operations, write operations, evicting cache lines, generating miss signals when an access request misses (e.g., the requested information is not found in cache memory 220), and so on.

Cache controller 205 also includes request tracking circuitry, implemented here as counters 203. In the embodiment shown, counters 203 comprise circuitry that counts incoming cache access requests. Counting of requests may be conducted based on identifiers associated with the requesting agents, and thus a separate count may be tracked for each. In the embodiment shown, up to N different counts may be accumulated for various ones of the identifiers. It is noted that (and is discussed further below) that each identifier may be associated with a given one of the agents, while agents may be associated with one or more identifiers, and where the identifiers may correspond to a particular data set. However, the disclosure is not limited to such embodiments, as any suitable scheme for tracking requests among various requestors may be implemented within the scope of this disclosure. For example, and embodiment in which each agent has one unique ID with respect to the other agents is also possible and contemplated.

While embodiments of counters 203 may, at a basic level, accumulate count values indicative of a number of cache access requests by various requestors/agents, embodiments are possible and contemplated in which counters 203 accumulate additional information. For example, embodiments are possible and contemplated in which counters 203 accumulate counts for particular cache lines requested by a particular agent and where hits and misses are also counted. This information may yield additional insight into the cache usage by a particular agent. For example, a high miss rate coupled with a large number of requests may indicate that access for a particular agent could be better optimized by providing a greater allocation. In another example, if a particular agent is executing a loop in which a particular cache line is repeatedly requested with resulting hits, while the agent has few if any requests for other cache lines, that agent may be allocated a smaller amount of cache memory despite a high number of requests. Similarly, agents with an accumulated count value indicating a small number of requests with a high hit rate may have an optimized amount of cache space allocated thereto.

Generally speaking, counters 203 may track a number of cache access requests for a particular agent, but may also in various embodiments track additional information associated with those requests. The raw data gathered by counters 203 may at various time intervals be provided to cache allocation circuit 204, which can use this data to determine optimum cache allocations. Furthermore, the circuits used to implement counters 203 may allow for faster updates and more fine-grained control of cache allocations than would be possible using system software. Additional discussion of the operation of counters 203 in various embodiments is provided below in reference to FIG. 2B.

Cache allocation circuit 204 is coupled to receive the accumulated count values from counters 203 and perform various functions to determine the optimum cache allocations for the various requesting agents. In the embodiment shown, cache allocation circuit 204 includes a number of comparators 205. The comparators 205 are configured to perform comparisons of the accumulated count values received to various thresholds. These comparisons may be used to determine if a cache space allocation to a particular agent is less than or greater than an optimum value, or within some range that is at or close to optimum. It is noted that the thresholds used as a basis for comparison may vary from one agent to the next and/or from one identifier to the next. For example, count values for agents expected to use a larger amount of cache space (e.g., based on historical trends or other metrics) may be compared to different thresholds than those expected to use a smaller amount. In another example, an accumulated count value for agent expected to access a large number of different lines of the cache may be compared to different thresholds than another agent that accesses only a few cache lines even if those accesses occur frequently.

Another factor that may be considered by cache allocation circuit 204 in determining cache allocations is priority. Certain agents and identifiers associated therewith may, for example, have a higher priority than others. For example, an agent with a higher performance demand (and thus a demand for a greater hit rate) may have a higher priority value over an agent having a lesser performance demand. Other factors being equal, an agent having a higher priority may be allocated additional cache space over an agent with a lower priority.

Weighting may also be used by cache allocation circuit 204 in determining cache allocations. In one embodiment, the weighting may be based on historical cache and memory usage by various agents and their associated identifiers. Other factors may be considered as well. For example, if an agent is associated with code that includes a significant number of load and/or store operations, it may be more heavily weighted than an agent associated with code having a small number of loads and/or stores. As noted elsewhere in the description, agents that have more memory accesses may receive higher cache quota allocations during updates, since these agents are subject to reduced performance if accesses are made to the memory instead of the cache. Thus, if the cache allocations are assigned by proportion (e.g., 1=full cache, 0.5=half cache, etc.), these proportions may be altered based on memory accesses (as distinguished from cache accesses). In one embodiment, a formula for applying weights based on historical data is as follows:

$$\text{proportion}_i = w \cdot \text{old\_proportion}_i + (1-w)\frac{\text{dram\_bytes}}{\text{dram\_bytes\_total}},$$

$$\text{quota}_i = \text{proportion}_i \cdot \text{cache\_size}.$$

In the above formula, a current proportion (proportion$_i$) is determined based on a previous proportion (old_proportion$_i$), a weighting factor w, and a proportion of a dynamic random access memory (DRAM) accessed by the corresponding agent. The quota of the cache to be allocated is then determined as a product of the proportion and the cache size. This calculation may be performed, in one embodiment, on a periodic basis in an effort to maintain optimization of cache usage by the various agents competing for access thereto.

In various embodiments, the weighting may be performed on a scale between 0 and 1. A weight above 0.5, when applied to the formula above, may favor previously determined cache quotas. Weights below 0.5 may favor larger changes to the cache quota, while a weight of 0.5 may favor quotas that are near the most recent previous quota.

Embodiments are further possible and contemplated in which cache quotas are allowed to overlap, with the sum of their respective proportions being greater than the full size of the cache. This may allow for better optimization of cache usage when a particular agent accesses memory often but does not repeat accesses to the same data (thereby having less cache utilization despite more frequent memory accesses). Accordingly, the formula above may be modified to include an overlap factor, as shown below:

$$\text{proportion}_i =$$

$$w \cdot \text{old\_proportion}_i + (1-w) \cdot \text{overlap\_factor} \cdot \frac{\text{dram\_bytes}}{\text{dram\_bytes\_total}}.$$

An overlap factor of 1 is indicative of a situation in which there is no overlap and the sum of the cache quota allocations add up to 100% of the cache's capacity. Thus, for overlap factors greater than 1, the amount of cache capacity allocated to the various agents has a sum that is greater than 100%. Individual allocations may be capped at 100% of the cache's capacity. This formula may account for situations where some agents are not fully utilizing their full cache allocation despite having a relatively high value of the same. The above formula may be further modified by changing the last term to one that considers DRAM access savings based on changes in the assigned quota. Accordingly, if a increasing the cache quota for a first agent results in a greater reduction of DRAM accesses relative to a second agent, the first agent may be assigned a larger cache quota during an update.

Cache allocation circuit 204 in the embodiment shown may use results of comparisons, weightings, priority, various formulas such as those discussed above, and other factors to determine an optimum amount of cache space to be allocated to the various agents competing for access thereto. This information may then be provided to cache allocation registers 206, which stores the allocation information. It is noted that cache allocation registers 206 is shown here as an entity separate from cache allocation circuit 205, although embodiments are possible and contemplated where in which the former is integrated into the latter.

Control circuit 207 in the embodiment shown may carry out the allocations of cache space as stored in cache allocation registers 207. This may include changing the allocations in cases where the most recent previous allocation is determined to no longer be optimum. In carrying out allocations, control circuit 207 may determine locations in the cache where information corresponding to particular ones of the requesting agents is to be stored. For example, if cache memory 220 is a set associative cache, control circuit 207 may determine which set(s) and way(s) are to be allocated for storing information corresponding to a particular agent.

The updating of cache allocations may occur at various intervals in different embodiments. For example, embodiments are possible and contemplated in which the cache allocations are periodically determined and possibly updated. In the embodiment shown in FIG. 2A, cache controller 205 includes a timer 208 for determining cache allocations at periodic intervals. At the beginning of an interval, timer 208 may begin running and continue until some specified time is reached. During the interval in which timer 208 is running, counters 203 may count the requests submitted by the various agents, and may gather other information as well (per the discussion above). At the expiration of the interval, as indicated by timer 208, counters 203 may provide the accumulated count values to cache allocation circuit 204. Cache allocation circuit 204 may then use these accumulated count values, along with any other information provided by counters 203 to determine an optimum allocation of the cache space for the various agents competing for access. After storing this information in cache allocation registers 206, control circuit 207 may update the allocations if they have changed from their most recent values. Additionally, cache allocation circuit 204 may assert a reset signal that is provided to timer 208 and counters 203. In response to assertion of the reset signal, the count values of counters 203 are reset to zero, as is the elapsed time indicated by timer 208. Timer 208 may then begin running again until the specified time, asserting the "Interval Expired" signal when that time has elapsed.

It is noted that, while cache allocation circuit 204 in the embodiment shown is implemented within cache controller 205, the disclosure is not limited in this manner. Embodiments are possible and contemplated in which the functions of cache allocation circuit 204 are implemented in another portion of a system. For example, in a system-on-a-chip (SoC), the functions provided by cache allocation circuit 204 may be implemented in an "always on" portion of the chip, where the "always on" portion is defined as a portion of the chip that operates whenever the SoC is receiving power from an external source and further, that operates without any sleep states.

Embodiments are also possible and contemplated where the determination of cache allocations is event-driven. For example, an event such as a context switch could be a trigger to cause cache allocations to be updated. Other events, such as beginning execution of a new software program or discontinuing execution of a software program could also be events that trigger an updating of the cache allocations. Embodiments that utilize a combination of updating at periodic intervals along with event-triggered updating are also possible and contemplated. For example, if a triggering event occurs between the periodic updates, cache allocations may be updated before the current interval expires, with the timer being reset to begin the next periodic interval.

Figure 2B:
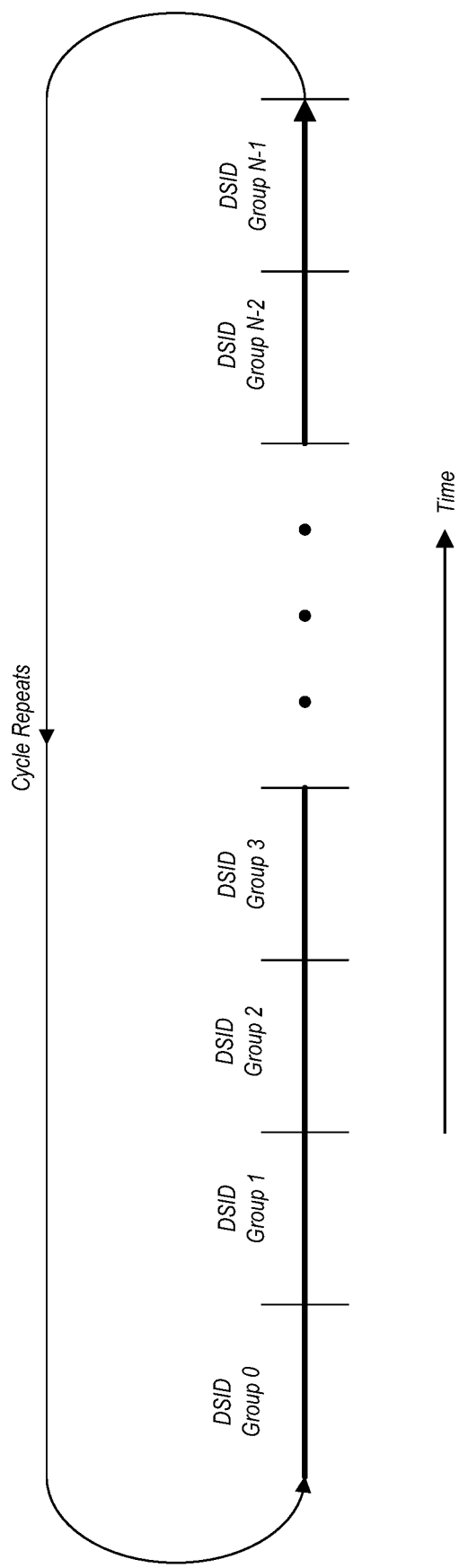
FIG. 2B is a diagram illustrating the use of counters for tracking cache access requests in one embodiment of a cache subsystem.

FIG. 2B is a diagram further illustrating the operation of counters in one embodiment of a cache subsystem utilizing cache quota control as disclosed herein. In some embodiments, cache quotas may be controlled based on data set identifiers (which are discussed in further detail below). Briefly stated, a data set identifier is associated with one or more agents that may request access to a cache, and these agents can include both hardware and software entities. Furthermore, data set identifiers may be grouped in various ways (e.g., by similar tasks, by multiple threads working on the same task, similar or like circuit units, etc.). These groups may be referred to as data set identifier (DSID) groups, which may also be referred to as quota groups. In some systems there a large number of data set identifiers and data set identifier groups. However, the number of counters that can be implemented may be limited by factors such as circuit area on a chip, which may be needed for other resources. Since the number of groups may exceed the number of counters, the present disclosure contemplates embodiments in which the counters are shared among the groups in a time-division multiplexing cycle.

As shown in FIG. 2B, a sequence is shown in whether a total of N data set identifier groups share a number of counters. Each of the data set identifier groups is allotted a time slot, with the number of timeslots available in a given cycle being equal to the number data set identifiers for which cache allocations are tracked, or N as shown here. In this example, the counters are allocated in a first time slot to data set identifier group 0, which counts cache access requests for the various agents associated that group. After the time has elapsed (e.g., as indicated by a timer), the accumulated count values are stored in some storage mechanism, such as a set of registers and the counters may be reset. The counters are then allocated to a second data set identifier group 1 for the next time slot, and cache access requests are counted for the agents associated with that group and the count values subsequently stored. This cycle repeats until counting has been conducted for each of the N groups, and then returns again to group 0.

Evaluation and updating of cache quotas in the sequence shown here may be conducted in various ways. In one embodiment, the cache quotas may be evaluation may be conducted upon the completion of each timeslot, with cache quotas potentially being updated based on the accumulated count values. In particular, if the count values for various agents in a particular group have changed significantly from a previous iteration (e.g., increased by more than some threshold value), the cache quotas may be updated correspondingly by cache allocation circuit 204 of FIG. 2A. It is noted that in some instances, when a particular agent is submitting a large number of requests, a corresponding counter may saturate. On the other hand, if the count values for various agents of a particular group did not change significantly or at all from a previous iteration, cache allocation circuit 204 may forgo updates based on the count values accumulated in the particular time slot. Since cache quotas may change upon completing a particular time slot for the agents associated with that data set identifier group, it follows that cache quotas may change for other groups that were not counted during that particular time slot. For example, cache allocation circuit 204 may, upon increasing the cache quotas for one or more agents in a most recently tracked group, it may select another group for a reduction of cache quotas based on various factors (e.g., low usage).

In some situations, a particular counter may push a particular value (e.g., all logic 1's) to the cache allocation circuit, with the particular value indicating that accesses were not counted for that agent. In some embodiments, software, such as an operating system, may handle the cache allocation for that particular agent.

Another embodiment is contemplated in which cache allocations are evaluated at once per each cycle as shown in FIG. 2B. That is, count values are accumulated for all data set identifier groups in a full cycle, with cache allocation circuit evaluating the count values and determining based thereon whether to cache quotas are to be updated, and if so, for which agents. Further embodiments are contemplated in which evaluations and potential updates may be performed multiple times per cycle, although not with every data set identifier group (e.g., after counts are accumulated with every fourth group). In some embodiments, the frequency at which evaluations and possible allocations occur may be dynamic depending on, e.g., currently active agents, types of memory traffic being generated (e.g., real-time vs. non-real-time), and so on.

It is noted that the amount of time that the counters perform counting of cache access requests for a given group of data set identifiers may be configurable in various embodiments. As a result the time consumed by the entirety of the cycle as shown in FIG. 2B is also configurable.

Figure 3:
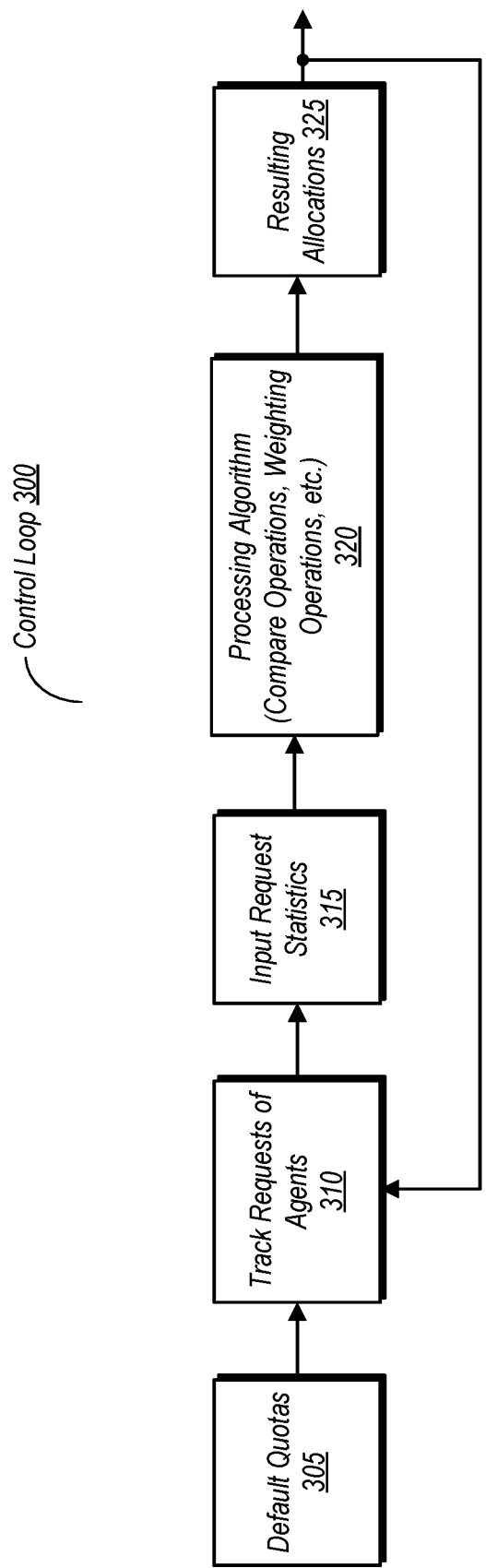
FIG. 3 is a block diagram of one embodiment illustrating a closed-loop control scheme for determining cache allocations.

Cache Control Loop Model:

FIG. 3 is a block diagram illustrating a closed-loop control scheme for determining cache allocations in one embodiment of a cache subsystem. In the embodiment shown, control loop 300 is a closed-loop system that may update allocations of cache space to various agents at various time intervals. The intervals may be periodic, event-triggered, or some other type.

At the beginning of operation, or upon an event such as a cache flush, default quotas 305 are used to allocate cache space among the agents submitting requests for access thereto. As operation commences, the requests submitted by the various agents are tracked (block 310). After some time interval has elapsed, the request statistics are input (block 315). These statistics may include accumulated count values, hit or miss rates, and so on. Other information may also be provided as an input, such as the number of unique cache lines requested/accessed by each of the various agents and so on. Weighting and priority factors may also be applied.

Using the statistical input, a processing algorithm is executed (block 320, e.g., by cache allocation circuit 204 of FIG. 2). The processing algorithm may include comparing accumulated request counts for each of the various agents to one or more threshold values, applying the weights and/or priority levels, and so on. Based on the particular processing algorithm applied, resulting cache allocations are determined (block 325). The determination of cache allocations may include increasing the cache space quota for various agents, reducing the cache space quota for various agents, and/or keeping the cache space quota at a current allocation for various agents.

Figure 4:
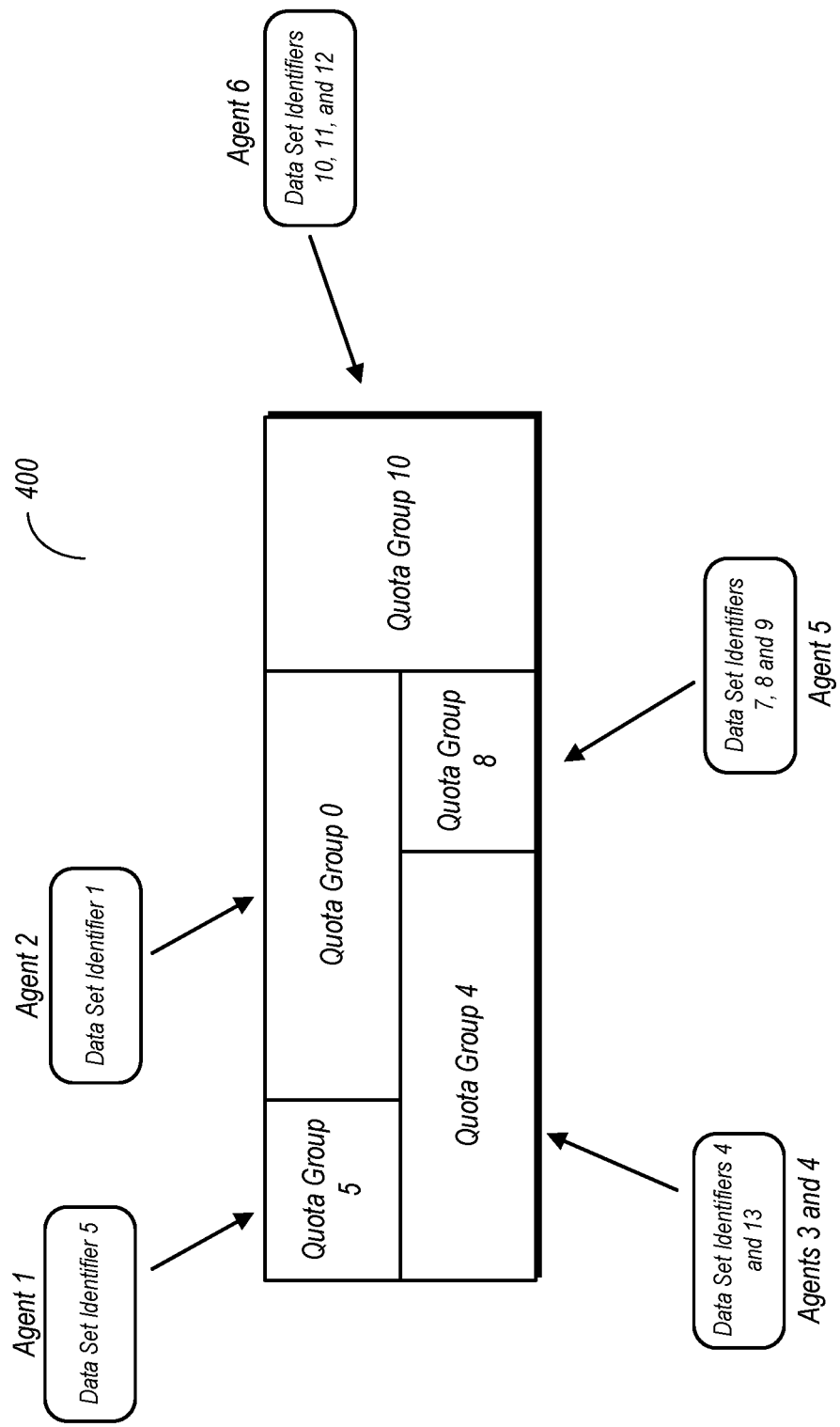
FIG. 4 is a block diagram illustrating an example of a cache having different portions allocated to different agents.

Data Set Identifiers:

FIG. 4 is a block diagram illustrating an example of a cache having different portions allocated to different agents, wherein the agents are associated with one or more data set identifiers. In the embodiment of the illustrated example, each of the agents submitting requests may be associated with one or more data set identifiers. The cache allocations for cache 400 in this example are divided into quota groups, each of which is associated with at least one data set identifier. Based on this arrangement, each quota group is associated with at least one agent, although quota groups may be associated with multiple agents.

In the example shown, Agent 1 is associated with Data Set Identifier 5 and Quota Group 5. Agent 2 is associated with Data Set Identifier 1 and Quota Group 0. Data Set Identifiers 4 and 13 are associated with Agents 3 and 4, respectively, and are included in Quota Group 4. Agent 5 in the illustrated example is associated with Data Set Identifiers 7, 8, and 9, and Quota Group 8. Agent 6 is associated with Data Set Identifiers 10, 11, and 12, and Quota Group 10.

In embodiments that utilize them, there are a specified number of data set identifiers. These identifiers may be associated with particular types of tasks and the behavior thereof, and both weighting and prioritizing may be based there upon. When an agent is active and making requests, it is associated with a particular data set identifier, and may remain so as long as it is active. For example, a device driver associated with a particular peripheral device may be associated with a particular data set identifier, and thus be assigned to a particular quota group.

Each data set identifier may have various attributes, such as a priority level, replaceability within a particular quota group, age-out weighting factors (to determine when a data set identifier can be de-prioritized or replaced due to age), maximum and minimum cache footprints for a quota group in which it is included, and so on. Furthermore, data set identifiers are transferrable from one agent to another, such as when one agent discontinues operation as operation is commenced by another.

The various attributes of a data set identifier may be used in determining the amount of cache space allocated thereto. In the illustrated example, Data Set Identifier 1 (and thus, Agent 2) in the illustrated example is allocated a larger amount of cache space than any other data set identifier. This may in part be due to a priority attribute, although the number of requests and other information discussed above may also be a factor on its particular allocation.

In some embodiments of the cache subsystem illustrated in FIG. 2, the accumulated count values may correspond to quota groups, rather than explicitly to agents. In other embodiments, the accumulated count values may correspond to data set identifiers, rather than explicitly to agents. Nevertheless, the association between agents, data set identifiers, and quota groups may result in particular agents being allocated particular amounts of cache space.

Figure 5:
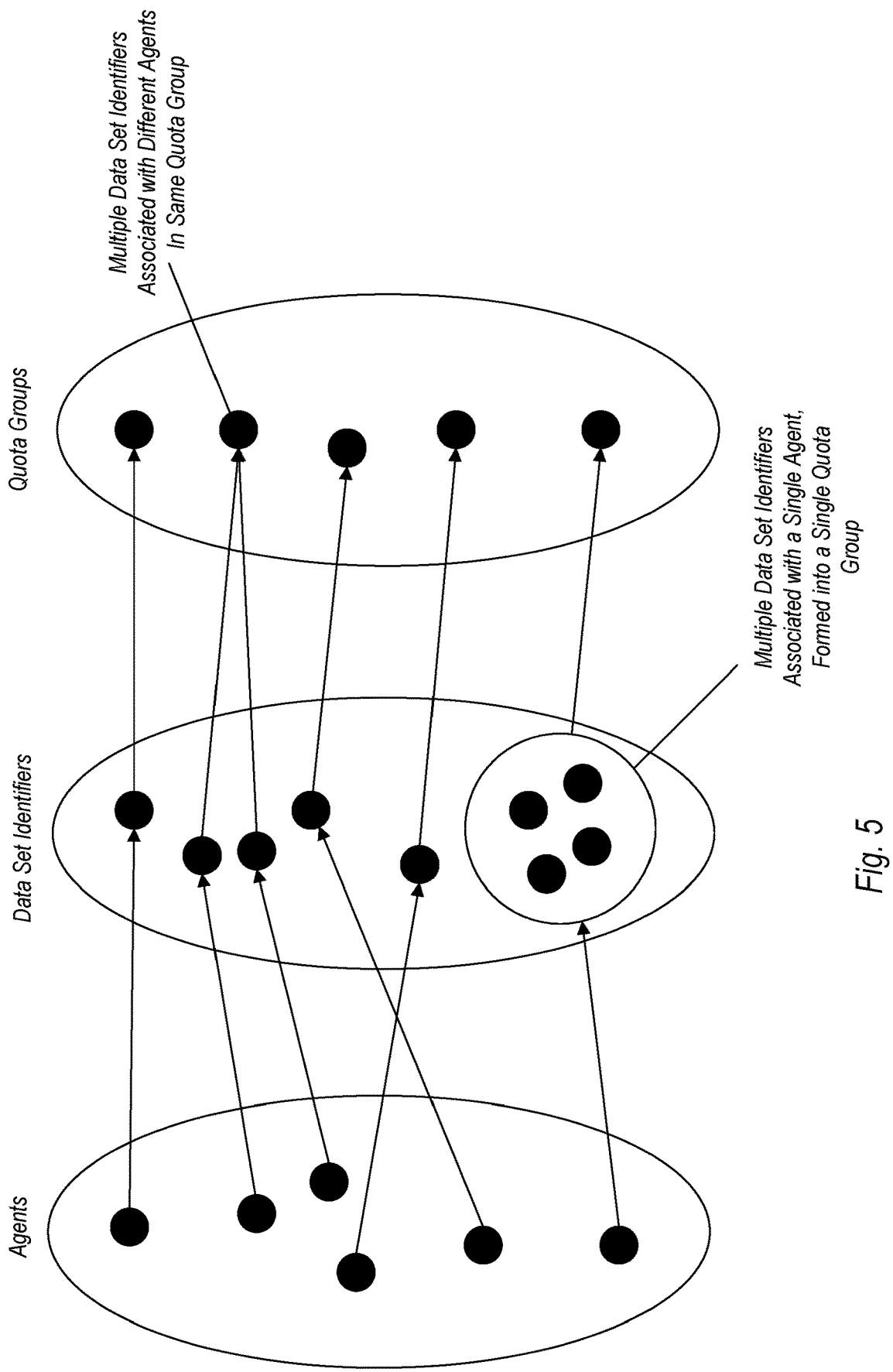
FIG. 5 is a diagram illustrating a correlation between data set identifiers and agents used in one embodiment of a scheme for determining cache allocations.

FIG. 5 is a diagram illustrating a correlation between data set identifiers and agents used in one embodiment of a scheme for determining cache allocations. In particular, FIG. 5 shows how various agents can be mapped to particular data set identifiers, and how the data set identifiers may be mapped to particular quota groups. As shown herein, a particular agent can be mapped to as few as one data set identifier. Similarly, a particular data set identifier can be mapped to a quota group that may or may not include other data set identifiers.

In this particular example, at least one agent is mapped to multiple ones of the data set identifiers, four in this example, although this number is not intended to be limiting. The four data set identifiers to which the single agent is mapped is in turn mapped to a single quota group. Another quota group in the illustrated example has two different data set identifiers mapped thereto, with two different agents uniquely mapped to corresponding ones of the two data set identifiers. Thus, the particular quota group includes two different agents.

The use of quota groups and corresponding data set identifiers may allow the partitioning of agents which are known to have similar behavior and thus take into account different agent request patterns. This in turn can prevent particular agents from consuming an excessive amount of cache space by controlling their allotted quota.

Figure 6:
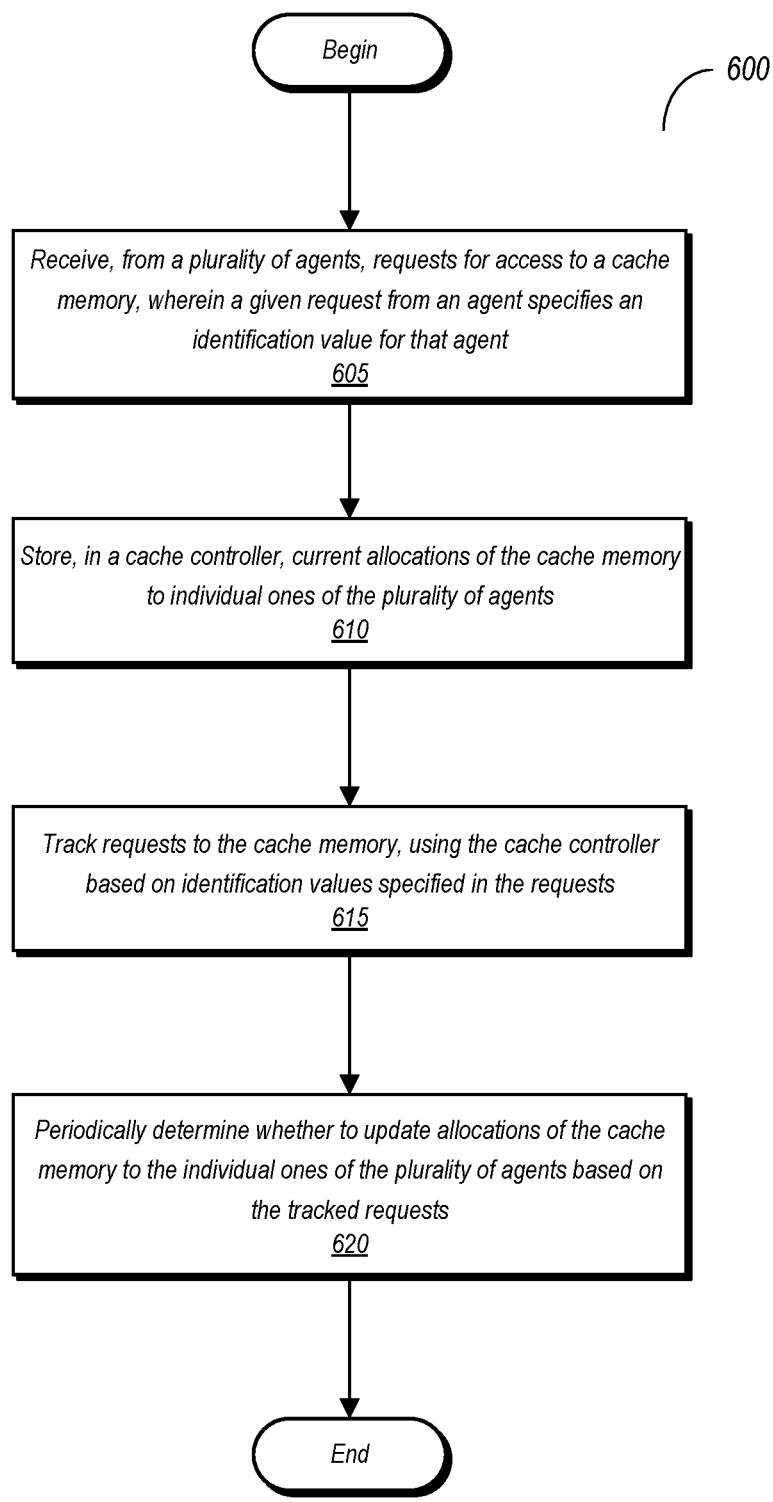
FIG. 6 is a flow diagram illustrating one embodiment of a method for operating a cache subsystem.

Methods for Operating a Cache Subsystem:

FIG. 6 is a flow diagram of one embodiment of a method for operating a cache subsystem that utilizes closed loop cache quota control. Method 600 may be performed by any of the various cache subsystem embodiments discussed above. Furthermore, embodiments of systems capable of carrying out Method 600 not otherwise discussed herein are also considered to fall within the scope of this disclosure.

Method 600 includes receiving, from a plurality of agents, requests for access to a cache memory, wherein a given request from an agent specifies an identification value for that agent (block 605). The method further includes storing, in a cache controller, current allocations of the cache memory to individual ones of the plurality of agents (block 610). Operation of the cache subsystem in accordance with Method 600 further includes tracking requests for access to the cache memory, using the cache controller, based on identification values specified in the requests (block 615) and determining whether to update allocations of the cache memory to the individual ones of the plurality of agents based on the tracked requests (block 620).

In various embodiments, tracking requests to the cache memory comprises ones of a plurality of counters accumulating a count of a number of requests for access to the cache memory by ones of the plurality of agents. In these embodiments, determining whether to update the allocations of the cache memory may be performed at periodic intervals using accumulated count values from ones of the plurality of counters. Determining whether to update the allocations of the cache memory may also include comparing the accumulated count values to one or more thresholds. In various embodiments, determining whether to update the allocations of the cache memory includes determining priority levels for ones of the plurality of agents. Such priority levels may be used as a factor in determining the amount of cache space to allocate to various ones of the agents. Agents with a higher priority may receive cache space allocation over agents with a lower priority.

Embodiments are further possible and contemplated wherein ones of the plurality of agents are associated with corresponding ones of a plurality of quota groups, and wherein ones of the plurality of quota groups include one or more data set identifiers, wherein ones of the data set identifiers group data together based on a particular task carried out by a corresponding one of the plurality of agents associated with a one of the quota groups in which it is included. The ones of the data set identifiers may be associated with a corresponding set of attributes. The corresponding set of attributes for a particular one of the data set identifiers may include a persistence level indicating whether cache lines associated with the particular one of the data set identifiers can be replaced by another cache line with another data set identifier falling within a same one of the plurality of quota groups. The corresponding set of attributes may also include a limit attribute indicating a maximum number of data set identifiers that can be mapped to a corresponding quota group.

Figure 7:
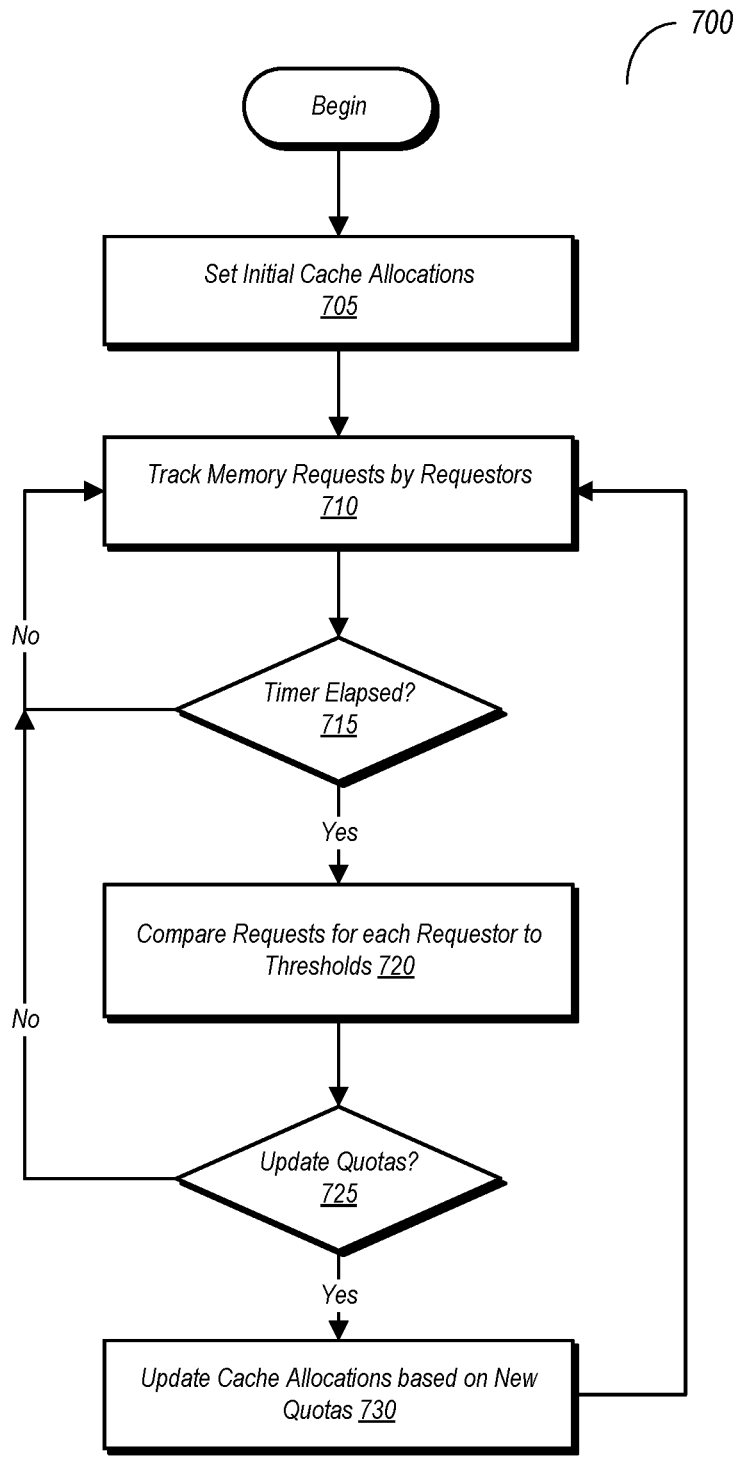
FIG. 7 is a flow diagram illustrating another embodiment of a method for operating a cache subsystem.

FIG. 7 is a flow diagram of another embodiment of a method for operating a cache subsystem. Like Method 600, Method 700 may be carried out by any embodiment of a cache subsystem as disclosed herein. Furthermore, embodiments of a cache subsystem not discussed herein that are nevertheless capable of carrying out Method 700 also fall within the scope of this disclosure.

Method 700 begins with a setting of initial cache allocations (block 705). This may occur at the beginning of operation of the cache subsystem, or in response to an event in which the entirety of the cache is flushed. As operation of the cache subsystem commences, Method 700 further includes tracking memory requests by various requestors (block 710). The tracking may be conducted in various ways. In one embodiment, counters are provided for the various requestors, and the cache access requests submitted thereby are counted. The requestors may correspond to, particular hardware components in a processor/computer system, various instruction threads, data sets (as discussed above), any other suitable mechanism for categorizing access requests, and/or any combination thereof.

Cache access requests may be tracked for the various requestors over some interval of time that is tracked by a timer. If the timer has not elapsed (block 715, no), tracking of requests continues. If the timer has elapsed (block 715, yes), the information regarding the tracking of requests is gathered for analysis. In embodiments in which counters are utilized, the accumulated count values are provided to indicate the numbers of requests submitted by the various requestors over the time interval. The number of requests for each of the requestors is then compared to one or more thresholds (block 720). The threshold may vary from one requestor to the next. For example, if one requestor corresponds to an agent that submits relatively frequent accesses the cache and/or system memory, its threshold may be different from one in which the particular requestor that typically submits relatively few access requests.

Based on the comparisons, a determination is made as to whether to update the cache quotas. If the current cache allocations are determined to be sufficient and in proportion for the various requestors, no update to the quotas is performed (block 725, no), and the method returns to block 710. However, if the current cache allocations are determined to be out of balance with respect to the current demand, cache quotas may be updated (block 725, yes). For example, if a first requestor is allocated an amount of cache greatly exceeding the amount it is using, while a second requestor is more frequently submitting cache requests and missing due to a less-than-sufficient allocation, the quota for the first requestor may be reduced while the quota for the second requestor may be increased. The cache quotas are thus updated per block 730, and the method then returns to block 710.

Figure 8:
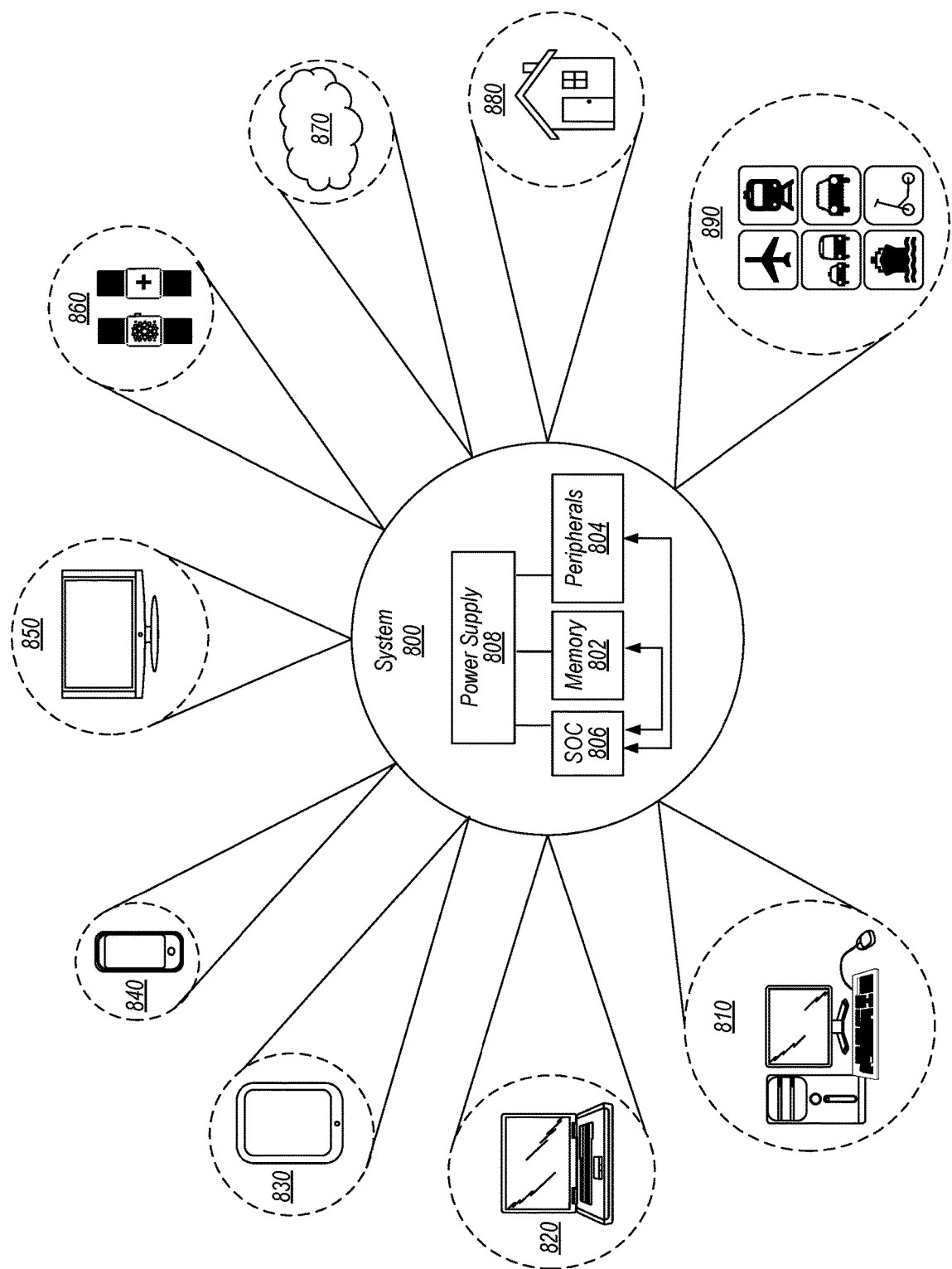
FIG. 8 is a block diagram of one embodiment of an example system.

Example System:

Turning next to FIG. 8, a block diagram of one embodiment of a system 800 is shown that may incorporate and/or otherwise utilize the methods and mechanisms described herein. In the illustrated embodiment, the system 800 includes at least one instance of a system on chip (SoC) 806 which may include multiple types of processing units, such as a central processing unit (CPU), a graphics processing unit (GPU), or otherwise, a communication fabric, and interfaces to memories and input/output devices. In some embodiments, one or more processors in SoC 806 includes multiple execution lanes and an instruction issue queue. In various embodiments, SoC 806 is coupled to external memory 802, peripherals 804, and power supply 808.

A power supply 808 is also provided which supplies the supply voltages to SoC 806 as well as one or more supply voltages to the memory 802 and/or the peripherals 804. In various embodiments, power supply 808 represents a battery (e.g., a rechargeable battery in a smart phone, laptop or tablet computer, or other device). In some embodiments, more than one instance of SoC 806 is included (and more than one external memory 802 is included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

SoC 806 in the embodiment shown may include various levels of cache memory, some of which may be shared among various components, while others may be dedicated caches. Such cache memories may be implemented as a part of corresponding cache subsystems. At least some of the cache subsystems on SoC 806 may operate in accordance with the various hardware and method embodiments discussed above in reference to FIGS. 1-7. Accordingly, at least some of the various cache subsystems on SoC 806 may include closed-loop management of cache allocations by, e.g., quota group. Cache allocations to various requestors may be monitored to determine their respective cache demands. At various time intervals (e.g., periodically), the demands may be examined and the cache quotas updated for the various requestors. In this way, the allocations of the cache may be managed proactively instead of reactively through reliance on cache eviction and replacement policies.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, smartwatch 860 may include a variety of general-purpose computing related functions. For example, smartwatch 860 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 800 may further be used as part of a cloud-based service(s) 870. For example, the previously mentioned devices, and/or other devices, may access computing resources in the cloud (i.e., remotely located hardware and/or software resources). Still further, system 800 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 8 is the application of system 800 to various modes of transportation. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

\*\*\*

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

\*\*\*

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

\*\*\*

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
a cache memory configured to receive access requests from a plurality of agents, wherein a given request from a given agent of the plurality of agents specifies an identification value associated with that agent; and
a cache controller coupled to the cache memory, wherein the cache controller is configured to:
store indications of current allocations of the cache memory to individual ones of the plurality of agents;
track requests to the cache memory based on identification values specified in the requests; and
determine whether to update allocations of the cache memory to the individual ones of the plurality of agents based on tracked requests, wherein, in determining whether to update allocations, the cache controller is configured to determine weighting values, based on accesses to a system memory, by the individual ones of the plurality of agents;
wherein the cache controller includes a plurality of counters configured to, for a first time interval, count cache access requests for ones of the plurality of agents associated with a first subset of a plurality of data set identifiers, and, for a second time interval, count cache access requests for ones of the plurality of agents associated with a second subset of the plurality of data set identifiers.

2. The apparatus of claim 1, wherein the cache controller is configured to, using ones of the plurality of counters, count the requests to the cache memory for corresponding ones of the plurality of agents, wherein a given one of the plurality of agents is associated with one or more of the plurality of data set identifiers.

3. The apparatus of claim 2, wherein the cache controller includes a timer, and wherein the cache controller is configured to read accumulated count values from ones of the plurality of counters in response to the timer expiring.

4. The apparatus of claim 3, wherein the cache controller is configured to periodically determine, based on intervals set by the timer, whether to update allocations of the cache memory to the individual ones of the plurality of agents by reading the accumulated count values.

5. The apparatus of claim 3, wherein the cache controller is configured to perform comparisons of the accumulated count values in one or more of the plurality of counters to one or more thresholds, and further configured to determine cache allocations based on the comparisons.

6. The apparatus of claim 1, wherein the identification values associated with ones of the plurality of agents are associated with a priority level, and wherein the cache controller is further configured to determine whether to update allocations of the cache memory to the individual ones of the plurality of agents based on respective priority levels associated with ones of the plurality of agents.

7. The apparatus of claim 1, wherein ones of the plurality of agents are associated with corresponding ones of a plurality of quota groups, and wherein ones of the quota groups include one or more of the plurality of data set identifiers, wherein ones of the plurality of data set identifiers group data together based on a particular task carried out by a one of the plurality of agents associated with a one of the quota groups in which it is included.

8. The apparatus of claim 7, wherein ones of the plurality of data set identifiers are associated with a corresponding set of attributes, wherein the corresponding set of attributes for a particular one of the plurality of data set identifiers includes a persistence level indicating whether cache lines associated with the particular one of the data set identifiers can be replaced by another cache line with another data set identifier falling within a same one of the plurality of quota groups.

9. The apparatus of claim 8, wherein the corresponding set of attributes for the particular one of the plurality of data set identifiers includes a limit attribute indicating a maximum number of data set identifiers that can be mapped to a corresponding quota group.

10. A method comprising:
receiving, from a plurality of agents, requests for access to a cache memory, wherein a given request from an agent specifies an identification value for that agent;
storing, in a cache controller, current allocations of the cache memory to individual ones of the plurality of agents;
tracking requests for access to the cache memory, using the cache controller based on identification values specified in the requests, wherein the tracking requests for access includes:
counting, for a first time interval and using ones of a plurality of counters, cache access requests for ones of the plurality of agents associated with a first subset of a plurality of data set identifiers; and
counting, for a second time interval using ones of the plurality of counters, count cache access requests for ones of the plurality of agents associated with a second subset of the plurality of data set identifiers;
determining weighting values, by the cache controller, based on accesses to a system memory, by the individual ones of the plurality of agents; and
determining whether to update allocations of the cache memory to the individual ones of the plurality of agents based on the tracked requests and the weighting values.

11. The method of claim 10, wherein tracking requests to the cache memory comprises ones of a plurality of counters accumulating a count of a number of requests for access to the cache memory by ones of the plurality of agents, wherein a given one of the plurality of agents is associated with one or more of the plurality of data set identifiers.

12. The method of claim 11, wherein determining whether to update the allocations of the cache memory is performed at periodic intervals using accumulated count values from ones of the plurality of counters.

13. The method of claim 12, wherein determining whether to update the allocations of the cache memory includes comparing the accumulated count values to one or more thresholds.

14. The method of claim 12, wherein determining whether to update the allocations of the cache memory includes determining priority levels for ones of the plurality of agents.

15. The method of claim 10, wherein ones of the plurality of agents are associated with corresponding ones of a plurality of quota groups, and wherein ones of the plurality of quota groups include one or more of the plurality of data set identifiers, wherein ones of the plurality of data set identifiers group data together based on a particular task carried out by a corresponding one of the plurality of agents associated with a one of the quota groups in which it is included.

16. The method of claim 15, wherein ones of the plurality of data set identifiers are associated with a corresponding set of attributes, wherein the corresponding set of attributes for a particular one of the plurality of data set identifiers includes:
a persistence level indicating whether cache lines associated with the particular one of the plurality of data set identifiers can be replaced by another cache line with another of the plurality of data set identifiers falling within a same one of the plurality of quota groups; and
a limit attribute indicating a maximum number of the plurality of data set identifiers that can be mapped to a corresponding quota group.

17. A system comprising:
a plurality of agents; and
a cache subsystem including a cache controller and a cache memory, wherein the cache subsystem is configured to receive access requests from ones of the plurality of agents, wherein a given request from a given agent of the plurality of agents specifies an identification value associated with that agents, and wherein the cache controller is configured to:
store information indicating current allocations of the cache memory to individual ones of the plurality of agents;
track access requests, using identification values associated with ones of the plurality of agents, wherein the cache controller includes a plurality of counters configured to, for a first time interval, count cache access requests for agents associated with a first subset of a plurality of data set identifiers, and, for a second time interval, count cache access requests for agents associated with a second subset of the plurality of data set identifiers; and
determine whether to update allocations of the cache memory to individual ones of the plurality of agents based on tracked requests.

18. The system of claim 17, wherein the cache controller includes:
a cache allocation circuit configured to determine cache allocations based on accumulated count values in ones of the plurality of counters;
wherein the cache allocation circuit is configured to determine cache allocations based on performing comparisons of ones of the accumulated count values to one or more threshold values.

19. The system of claim 18, wherein the cache controller further includes a timer, wherein the cache allocation circuit is configured to periodically determine cache allocations in accordance with the timer, and wherein the cache allocation circuit is further configured to cause a reset of the counters in response to expiration of the timer.

20. The system of claim 17, wherein ones of the plurality of agents are associated with corresponding ones of a plurality of quota groups, and wherein ones of the quota groups include one or more of the plurality of data set identifiers, wherein ones of the plurality of data set identifiers group data together based on a particular task carried out by a one of the plurality of agents associated with a one of the quota groups in which it is included.

\* \* \* \* \*